(12) United States Patent
Lee et al.

(10) Patent No.: US 8,301,952 B2
(45) Date of Patent: Oct. 30, 2012

(54) METHOD FOR RESOURCE ALLOCATION FOR HYBRID-AUTOMATIC REPEAT REQUEST

(75) Inventors: Chang Hun Lee, Anyang-Si (KR); Sung Woong Ha, Anyang-Si (KR); Jeong Ki Kim, Anyang-Si (KR); Ki Seon Ryu, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 963 days.

(21) Appl. No.: 12/344,059

(22) Filed: Dec. 24, 2008

(65) Prior Publication Data

US 2009/0177937 A1 Jul. 9, 2009

(30) Foreign Application Priority Data

Dec. 28, 2007 (KR) .................. 10-2007-0140770

(51) Int. Cl.
*G08C 25/02* (2006.01)
*H04L 1/12* (2006.01)
*G08C 25/00* (2006.01)
*H04L 1/00* (2006.01)

(52) U.S. Cl. ........ 714/748; 714/749; 714/750; 714/751; 370/310; 370/311; 370/328; 370/329

(58) Field of Classification Search .................. None
See application file for complete search history.

(56) References Cited

U.S. PATENT DOCUMENTS

| | | | |
|---|---|---|---|
| 6,308,294 B1 | 10/2001 | Ghosh et al. | |
| 6,697,331 B1 | 2/2004 | Riihinen et al. | |
| 7,310,336 B2 | 12/2007 | Malkamaki | |
| 2006/0153112 A1* | 7/2006 | Lim et al. | 370/310 |
| 2008/0186885 A1* | 8/2008 | Athalye et al. | 370/310 |
| 2009/0077444 A1* | 3/2009 | Qi et al. | 714/748 |
| 2009/0092076 A1* | 4/2009 | Zheng et al. | 370/328 |
| 2009/0168708 A1* | 7/2009 | Kumar et al. | 370/329 |
| 2009/0190543 A1* | 7/2009 | Ihm et al. | 370/329 |
| 2010/0115369 A1* | 5/2010 | Ihm et al. | 714/749 |
| 2010/0146353 A1* | 6/2010 | Lim et al. | 714/748 |
| 2010/0202396 A1* | 8/2010 | Won et al. | 370/329 |
| 2011/0188432 A1* | 8/2011 | Yin | 370/311 |

FOREIGN PATENT DOCUMENTS

| | | |
|---|---|---|
| CN | 1423869 A | 6/2003 |
| CN | 1689262 A | 10/2005 |
| KR | 10-2006-0016466 A | 2/2006 |

OTHER PUBLICATIONS

Mobile WiMAX—Part I: A Technical Overview and Performance Evaluation, Aug. 2006, http://www.wimaxforum.org/technology/downloads/Mobile_WiMAX_Part1_Overview_and_Performance.pdf.*

* cited by examiner

*Primary Examiner* — M. Mujtaba K Chaudry
*Assistant Examiner* — Justin R Knapp
(74) *Attorney, Agent, or Firm* — Birch, Stewart, Kolasch & Birch, LLP

(57) ABSTRACT

A resource allocation method for a HARQ is disclosed. This resource allocation method includes, transmitting an MAP message having specific information indicating whether or not a differential allocation is supported, storing MAP information contained in the MAP message during a predetermined frame, and upon receiving an NACK message during the predetermined frame, transmitting sub-burst information having differential allocation information related to sub-bursts to be retransmitted. If there are a large amount of HARQ traffic, each embodiment of the present invention transmits only differential information on the basis of MAP information of the initial MAP message when HARQ sub-bursts is retransmitted.

7 Claims, 7 Drawing Sheets

METHOD FOR RESOURCE ALLOCATION FOR HYBRID-AUTOMATIC REPEAT REQUEST

CROSS-REFERENCE TO RELATED APPLICATIONS

This application claims the benefit of the Korean Patent Application No. 10-2008-0104648, filed on Dec. 28, 2007, which is hereby incorporated by reference as if fully set forth herein.

BACKGROUND OF THE INVENTION

1. Field of the Invention

The present invention relates to a resource allocation method for a hybrid automatic repeat request (HARQ), and more particularly to a method for transferring only a difference between information capable of being recognized by a media access protocol (MAP) message received from a previous frame and a retransmitted sub-burst, resulting in the implementation of resource allocation.

2. Discussion of the Related Art

A data retransmission method of a transmission end or a reception end will hereinafter be described in detail. A wireless communication system provides a high-speed data service using a limited amount of resources. For this high-speed data service, an automatic repeat request (ARQ) capable of effectively employing resources is used. Namely, if data generated from the transmission end fails to be transferred to the reception end, the reception end requests retransmission of this failed data. In this case, an automatic repeat request (ARQ) scheme has been widely used to automatically retransmit data.

According to the ARQ scheme, after the reception end has received data from a transmission end, it transmits an acknowledgement (ACK) signal and/or a non-acknowledgement (NACK) signal to the transmission end, such that the reception end informs the transmission end whether or not the data has been correctly received. If the transmission end receives the NACK signal from the reception end, it determines the occurrence of an error in the data transferred to the reception end, such that it retransmits the data to the reception end. The ARQ scheme has three kinds of ARQ schemes, i.e., a Stop-And-Wait (SAW) ARQ scheme, a Go-Back-N (GBN) ARQ scheme, and a Selective-Repeat (SR) ARQ scheme.

According to the SAW ARQ scheme, the transmission end transmits original data to the reception end, and waits to receive the ACK or NACK signal from the reception end. Upon receiving the ACK signal from the reception end, the transmission end transmits new data corresponding to the next data. Otherwise, if the transmission end receives the NACK signal from the reception end, it retransmits the original data instead of the next data. In other words, the SAW ARQ scheme transmits only one frame at one time. After the transmission end recognizes that the frame has been successfully transmitted to the reception end, it transmits the next frame.

According to the GBN ARQ scheme, it enables the transmission end to continuously transmit data, irrespective of a response message (e.g., ACK or NACK message) from the reception end. If the reception end does not receive data of a specific frame while receiving data from the transmission end, it is unable to transmit the ACK signal of the specific frame to the transmission end. So, the transmission end does not receive the ACK signal of the specific frame from the reception end, such that it retransmits data from the specific frame.

According to the SR ARQ scheme, if the transmission end receives the NACK signal from the reception end while continuously transmitting data to the reception end, it retransmits only specific data encountering the NACK signal to the reception end. If the transmission end receives the NACK signal from the reception end, it retransmits only data of a frame denoted by the NACK signal to the reception end, such that it can successfully transmit all of data to the reception end. The SR ARQ scheme must assign unique sequence numbers to individual frames, and must manage the individual frames. As a result, it is difficult to implement the SR ARQ scheme.

According to a scheme for configuring data in the form of a packet and transmitting this packet-formatted data, a higher data rate is needed for this packet-based data transmission scheme. In order to prevent any errors from being generated in a high-speed transmission environment, a new coding rate or a new modulation method is being intensively developed and applied to a communication system. There is also proposed a hybrid ARQ (HARQ) scheme suitable for the high-speed transmission environment.

According to the ARQ scheme, if data is faulty or erroneous data, the ARQ scheme discards this data. However, according to the HARQ scheme, the reception end stores the erroneous data in a buffer, combines the stored data with the retransmitted data, and applies a forward error correction (FEC) scheme to the combined resultant data. In other words, the HARQ scheme is considered that the FEC scheme is combined with the ARQ scheme. In this case, the HARQ scheme can be classified into four types, i.e., the following first to fourth types.

The first type of the HARQ scheme is as follows. According to the first type of the HARQ scheme, the reception end always checks the presence or absence of an error detection code in data, and primarily applies the FEC scheme to the checked result. If a packet received in the reception end has the remaining errors, the reception end requests the transmission end to retransmit the original data having no errors. The reception end discards the erroneous packet, the transmission end applies the same FEC code as that of the discarded packet to another packet to be retransmitted, and transmits the resultant packet.

The second type of the HARQ scheme is as follows. This second type of the HARQ scheme may also be called an incremental redundancy (IR) ARQ scheme. According to this IR ARQ scheme, the reception end does not discard a first transmission packet, stores the first transmission packet in a buffer, and combines the stored first transmission packet with retransmitted redundancy bits. During the data retransmission time, the transmission end retransmits only parity bits other than data bits. The parity bits retransmitted by the transmission end are changed to others whenever data is retransmitted.

The third type of the HARQ scheme is as follows. The third type of the HARQ scheme is a specific case of the above-mentioned second type. Each packet can be self-decodable. If the transmission end retransmits data, it configures a packet including both the erroneous part and the data part, and then retransmits the configured packet. This third type of the HARQ scheme can perform the decoding process more correctly than the above second type of the HARQ scheme, whereas it has a coding gain less than that of the second type of the HARQ scheme.

The fourth type of the HARQ scheme is as follows. According to the fourth type of the HARQ scheme, a specific function is added to the first type of the HARQ scheme. In more detail, this specific function enables the reception end to store first reception data, and allows this first reception data to be combined with retransmission data. This fourth type of the HARQ scheme is called a Metric Combining (MC) scheme or a Chase Combining (CC) scheme. The above fourth type of the HARQ scheme is advantageous to a Signal to Interference Noise Ratio (SINR) aspect, and always uses the same parity bits of retransmission data.

However, in order to allow a current system to support the HARQ scheme, a base station transmits subburst-associated information to a mobile station via a MAP message. In this case, if there are a large amount of HARQ traffic, the base station must continuously transmit the MAP message, such that an amount of overhead of the MAP message may unavoidably increase.

SUMMARY OF THE INVENTION

Generally, in order to support the HARQ scheme, a base station transmits HARQ-associated information to a mobile station via an MAP message. In this case, transmitting all of the HARQ-associated information when there are a large amount of HARQ traffic may unavoidably encounter a large amount of overhead. Therefore, embodiments of the present invention provide a method for transferring only differential information on the basis of MAP information which has been initially received from the base station. Preferably, the base station of the present invention may inform the mobile station of only a difference in location information on the basis of the MAP information. As a result, an amount of MAP overhead associated with the HARQ can be reduced, resulting in the improvement of a system performance.

The present invention has been devised to solve the above-mentioned technical problems. An object of the present invention is to provide a method for retransmitting only a difference in location information on the basis of MAP information acquired by an initial transmission action.

Another object of the present invention is to provide a method for transferring only a difference in location information on the basis of MAP information contained in a pre-transmitted MAP message, thereby reducing an amount of MAP overhead associated with the HARQ.

In order to solve the above-mentioned technical problems, the present invention provides a resource allocation method for a HARQ.

To achieve these objects and other advantages and in accordance with the purpose of the invention, as embodied and broadly described herein, a resource allocation method for a hybrid automatic repeat request (HARQ), the method includes: transmitting an MAP message having specific information indicating whether or not a differential allocation is supported; storing MAP information contained in the MAP message during a predetermined frame; and upon receiving a non-acknowledgement (NACK) message during the predetermined frame, transmitting sub-burst information having differential allocation information related to sub-bursts to be retransmitted.

The differential allocation information may include information indicating the number of reference frames to be retransmitted, reference frame offset information based on the number of the reference frames, information indicating the number of reference sub-bursts, and information indicating the number of reference sub-bursts.

The information indicating the number of the reference sub-bursts may include index information of the reference sub-bursts and repetition coding indication information.

The information indicating the number of the reference sub-bursts may include index information of the reference sub-bursts and sub-burst profile information.

The MAP message may be an SBC message, a DSx message, or an REG message.

The MAP information may include location information of a hybrid automatic repeat request (HARQ) sub-burst.

In another aspect of the present invention, there is provided a resource allocation method for a hybrid automatic repeat request (HARQ), the method including: receiving an MAP message having specific information indicating whether or not differential allocation is supported; storing MAP information contained in the MAP message during a predetermined frame; transmitting a non-acknowledgement (NACK) message to a base station, if there arises any error in data packets received during the predetermined frame; and receiving sub-burst information, which has differential allocation information related to sub-bursts for retransmitting the data packets, from the base station.

The differential allocation information may include information indicating the number of reference frames to be retransmitted, reference frame offset information based on the number of the reference frames, information indicating the number of reference bursts, and information indicating the number of reference sub-bursts.

The information indicating the number of the reference sub-bursts may include index information of the reference sub-bursts and repetition coding indication information.

The information indicating the number of the reference sub-bursts may include index information of the reference sub-bursts and sub-burst profile information.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
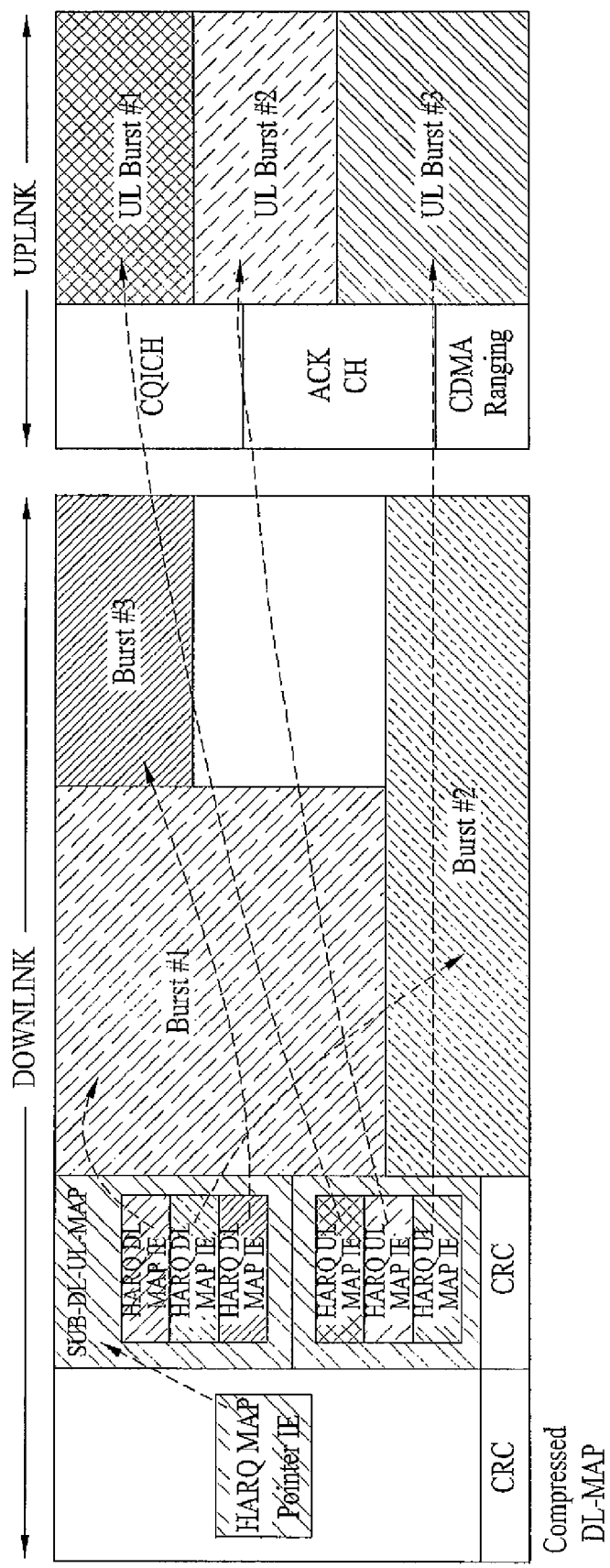
FIG. 1 is a conceptual diagram illustrating an MAP structure for use in an IEEE 802.16 system.

Reference will now be made in detail to the preferred embodiments of the present invention, examples of which are illustrated in the accompanying drawings.

In order to solve the above-mentioned problems, the present invention provides a resource allocation method for a HARQ. In other words, the present invention provides a method for transferring only a difference between information capable of being recognized by a MAP message received from a previous frame and a retransmitted sub-burst, resulting in the implementation of resource allocation.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with a user equipment (UE), a mobile station (MS) or a mobile subscriber station (MSS) as necessary.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The following embodiments of the present invention may be supported by standard documents disclosed in at least one of various wireless access systems, for example, the IEEE 802 system, the 3GPP system, the 3GPP LTE system, and the 3GPP2 system. In other words, unexplained steps or parts for definitely disclosing the technical idea of the present invention may be supported by the above-mentioned documents.

Also, all the terms or terminologies disclosed in the present invention may be explained by the above-mentioned standard documents.

Prior to describing the present invention, it should be noted that specific terms disclosed in the present invention are proposed for the convenience of description and better understanding of the present invention, and the use of these specific terms may be changed to another format within the technical scope or spirit of the present invention.

The embodiments of the present invention will hereinafter be described with reference to the annexed drawings.

FIG. 1 is a conceptual diagram illustrating a MAP structure for use in an IEEE 802.16 system.

In order to support the HARQ scheme, the IEEE 802.16 system uses a 'HARQ_DL_MAP_IE' field and a 'HARQ_UL_MAP_IE' field. In this case, each information element (IE) may assign a plurality of bursts.

Referring to FIG. 1, a 'HARQ_MAP_Pointer_IE' field may assign a downlink (DL) MAP sub-burst or an uplink (UL) MAP sub-burst. The 'HARQ_DL_MAP_IE' field may represent individual bursts of a downlink. The 'HARQ_UL_MAP_IE' field may represent individual bursts of an uplink.

The 'HARQ_DL_MAP_IE' field can support a variety of HARQ modes, for example, a Chase Combining HARQ mode, an IR-CTC HARQ mode, and an IR-CC HARQ mode used as an IR HARQ for convolution codes. According to the chase combining HARQ mode, a burst profile is represented by a DIUC. According to the IR-CTC HARQ mode, a burst profile is represented by NEP and NSCH parameters. The IR-CC HARQ mode is adapted to represent non-HARQ transmission.

Figure 2:
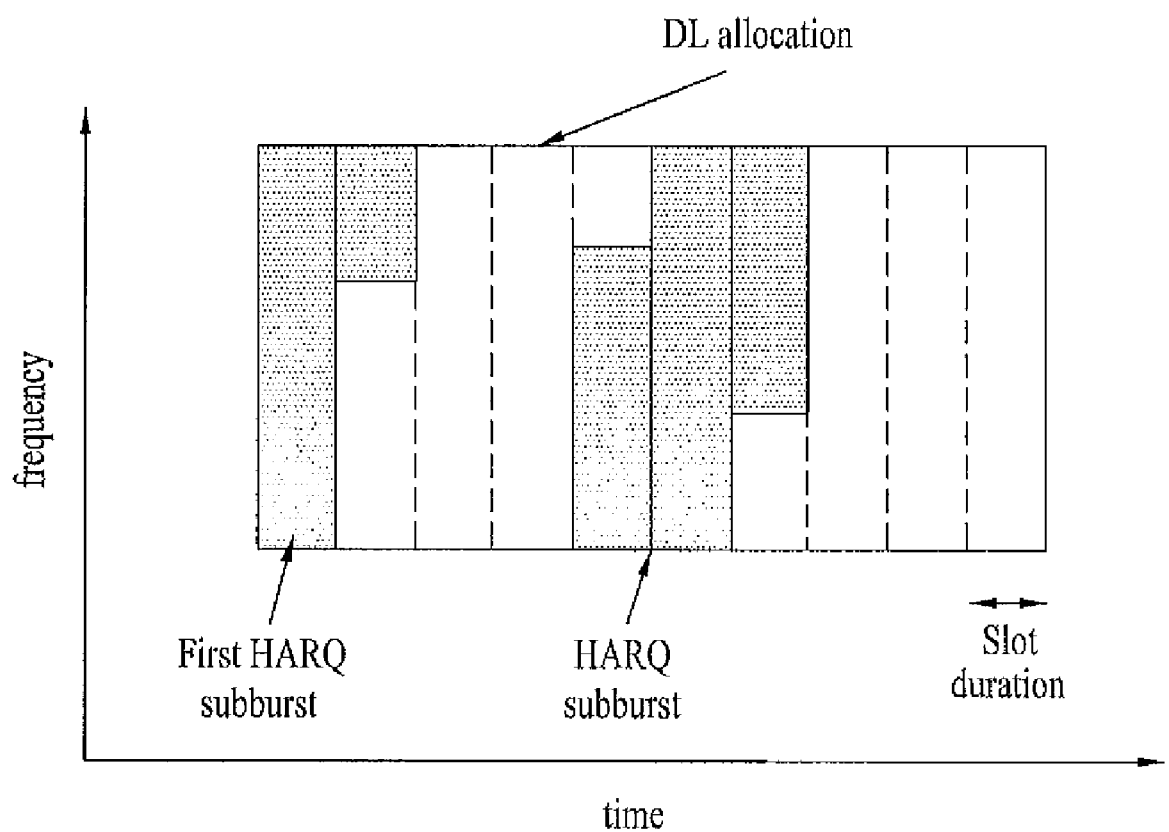
FIG. 2 is a conceptual diagram illustrating a HARQ downlink allocation structure.

FIG. 2 is a conceptual diagram illustrating a HARQ downlink allocation structure.

Referring to FIG. 2, one burst may be defined by at least one sub-burst IE. Individual sub-bursts may have different connection identifiers (CIDs). A 'HARQ_DL_MAP_IE' field defines at least one two-dimensional data zone. According to HARQ allocation, a predetermined number of slots are assigned to each burst, such that the data zone can be divided into the bursts and sub-bursts to which unique names are assigned. All the sub-bursts contained in the data zone may support only one HARQ mode. In this case, the number of slots is represented by the duration or the NSCH field. According to the order of allocated slots, the slot number begins at a specific slot having the lowest symbol number and the lowest channel, and increases in the order of slots having increasing sub-channel numbers. Namely, the slots are sequentially allocated in the order of frequency priorities. Individual sub-bursts may be encoded independent of each other.

For example, in order to allocate HARQ downlink resources, a base station may inform each mobile station of the size- and location-information of an area allocated for a single sub-burst. In other words, a first sub-burst is initially allocated to a first slot of the HARQ downlink area, and is then sequentially allocated to the remaining slots other than the first slot. A second sub-burst is initially allocated to the next slot of the slot allocated to the first sub-burst, and is then sequentially allocated to the remaining slots. In this way, the sub-burst may be sequentially allocated to a plurality of slots. In other words, if each mobile station receives HARQ area information and size information of a previous sub-burst, it can recognize the slot of the HARQ area having been allocated to the mobile station itself.

The individual sub-bursts may have different burst profiles. Therefore, under the chase combining HARQ mode and/or the IR-CC HARQ mode, the base station transmits a DIUC and a repetition coding indication parameter to each mobile station. Also, under the IR-CTC HARQ mode, the base station transmits NEP and NSCH parameters to each mobile station.

Under the HARQ mode, a single mobile station may have a plurality of HARQ channels, and is managed in sub-burst units via the individual channels. In order to discriminate among several HARQ channels, the base station must transmit an ACID to each sub-burst. The ACID is able to manage the HARQ channel in sub-burst units. The ACID field shall be set to the initial value of HARQ channel identifier.

Also, in order to discriminate between initial transmission and retransmission, an AL_SN message is transmitted. This AL_SN message may be adapted to discriminate among ARQ sequence numbers. The AL-SN field value shall be set to the initial ARQ identifier sequence number for each HARQ channel.

If the HARQ mode of the base station is the IR HARQ mode, the base station must transmit an SPID (Subpacket Identifier) to the mobile station in order to divide different redundancy versions. The base station can receive the ACK signal for each sub-burst. In order to determine whether to receive the ACK signal, the base station must transmit ACK disable information. In the MAP structure, the order of HARQ ACK channels is determined according to the order of sub-bursts having the ACK disable of '0'. In other words, the ACK channel is initially allocated to a first sub-burst having the lowest order in the MAP structure, and is then sequentially allocated to the remaining sub-bursts other than the first sub-burst.

Information transferred to each sub-burst by the base station to support the HARQ is as follows. The base station may transmit connection identifier (CID) information, duration information, burst profile information, control information (e.g., ACID, AI_SN, and SPID), or ACK disable information.

The IEEE 802.16 system supports a variety of HARQ modes. For example, the IEEE 802.16 system supports the Chase Combining HARQ mode, the IR-CC HARQ mode, the IR-CTC HARQ mode, the MIMO chase combining HARQ mode, the MIMO IR-CC HARQ mode, the MIMO IR-CTC HARQ mode, and the MIMO STC HARQ mode as above described.

Individual HARQ modes carry out different operations, and may have different parameters transferred to the base station. According to the general Chase Combing HARQ mode, the burst profile of the initial transmission must be always equal to that of the retransmission, whereas a slot repetition rate of the initial transmission may be different from that of the retransmission. Also, a redundancy version of the general Chase Combining HARQ mode is always set to '00', such that there is no need to transmit an SPID to each mobile station.

According to the IR HARQ mode, the burst profile (e.g., modulation order, coding type, and coding rate) and the redundancy version may be changed to others every transmission action. According to the IR-CTC HARQ mode, the burst profile is transmitted via the NEP and NSCH parameters. In the remaining HARQ modes, the burst profile can be transmitted via a DIUC and a repetition coding indication parameter.

The following Table 1 shows an exemplary HARQ_DL_MAP_IE format for use in a downlink.

TABLE 1

| Syntax | Bit | Notes |
|---|---|---|
| HARQ_DL_MAP_IE( ){ | | |
|   Extended-2 DIUC | 4 | HARQ_DL_MAP_IE( ) = 0x07 |
|   Length | 8 | Length in bytes |
|   RCID_Type | 2 | 0b00: Normal CID |
| | | 0b01: RCID 11 |
| | | 0b10: RCID 7 |
| | | 0b11: RCID 3 |
|   Reserved | 2 | |
|   While(data remains) | | |
|     Boosting | 3 | 0b000: Normal (not boosted) |
| | | 0b001: +6 dB |
| | | 0b010: −6 dB |
| | | 0b011: +9 dB |
| | | 0b100: +3 dB |
| | | 0b101: −3 dB |
| | | 0b110: −9 dB |
| | | 0b111: −12 dB |
|     Region_ID use indicator | 1 bit | 0: Region_ID unused |
| | | 1: Region_ID used |
|     If(Region_ID use indicator==0){ | | |
|       OFDMA symbol offset | 8 | Offset from the start symbol of DL subframe |
|       Subchannel offset | 7 | |
|       Number of OFDMA symbols | 7 | |
|       Number of subchannels | 7 | |
|       Rectangular Sub-Burst Indication | 1 | Indicates sub-burst allocations are time-first rectangular. The duration field in each sub-burst IE specifies the number of subchannels for each rectangular allocation. This is only valid for AMC allocations and all allocations with dedicated pilots. When this field is clear, sub-bursts shall be allocated in frequency-first manner and the |

TABLE 1-continued

| Syntax | Bit | Notes |
|---|---|---|
|  |  | duration field reverts to the default operation. |
|   reserved | 2 |  |
| } else { |  |  |
|   Region_ID | 8 | Index to the DL region defined in DL region definition TLV in DCD |
| } |  |  |
| Mode | 4 | Indicates the mode of this HARQ region:<br>0b0000: Chase HARQ<br>0b0001: Incremental redundancy HARQ for CTC<br>0b0010: Incremental redundancy HARQ for convolution Code<br>0b0011: MIMO Chase HARQ<br>0b0100: MIMO IR HARQ<br>0b0101: MIMO IR HARQ for Convolutional Code<br>0b0110: MIMO STC HARQ<br>0b0111-0b1111: Reserved |
| Subburst IE Length | 8 | Length in nibbles, to indicate the size of the subburst IE in this HARQ mode.<br>The MS may skip DL HARQ. Subburst IE if does not support the HARQ mode. However, the MS shall decode. NACK Channel field from each DL HARQ. Subburst IE to determine the UL ACK channel it shall use for its DL HARQ burst. |
| If(Mode==0b0000){ |  |  |
|   DL_HARQ_Chase_Sub-Burst_IE( ) | variable |  |
| } else if(Mode==0b0001){ |  |  |
|   DL_HARQ_IR_CTC_Sub-Burst_IE( ) | variable |  |
| } else if(Mode==0b0010){ |  |  |
|   DL_HARQ_IR_CC_Sub-Burst_IE( ) | variable |  |
| } else if(Mode==0b0011){ |  |  |
| MIMO_DL_Chase_HARQ_IR_HARQ_Sub-Burst_IE( ) | variable |  |
| } else if(Mode==0b0100){ |  |  |
|   MIMO_DL_IR_HARQ_Sub-Burst_IE( ) | variable |  |
| } else if(Mode==0b0101){ |  |  |
|   MIMO_DL_IR_HARQ_for_CC_Sub-Burst_IE( ) | variable |  |
| } else if(Mode==0b0110){ |  |  |
|   MIMO_DL_STC_HARQ_Sub-Burst_IE( ) | variable |  |
|   } |  |  |
| } |  |  |
| Padding | variable | padding to byte; shall be set to 0 |
| } |  |  |

The HARQ_DL_MAP_IE format uses a second extended-2 DIUC. Also, the base station may use a reduced CID (RCID), instead of a basic CID or a multicast CID, such that it can reduce the size of the HARQ MAP message. The RCID type (RCID_Type) is a parameter for indicating the type of a CID used in the HARQ_DL_MAP_IE. Therefore, if the RCID_Type parameter is '0b00', this means the use of a normal CID. If the RCID_Type parameter is '0b01', this means that the RCID composed of 11 bits is used. If the RCID_Type parameter is '0b10', this means that the RCID composed of 7 bits is used. If the RCID_Type parameter is '0b11', this means that the RCID composed of 3 bits is used.

A boosting parameter represents a power boost applied to a data subcarrier when the HARQ MAP message is allocated. If the allocation is carried out using an AMC or PUSC-ASCA permutation in an area employing a dedicated pilot, the boosting parameter is set to '0b000'. The size of the power boost allocated to each data subcarrier can be recognized by a 'boosting' field shown in Table 1.

If the 'Region_ID use indicator' parameter of Table 1 is '1', this means the use of the 'Region IDentifier' parameter, If the 'Region_ID use indicator' parameter of Table 1 is '0', this means the unused 'Region Identifier' parameter.

If the 'Region Identifier' parameter is not in use, a resource region denoted by 'HARQ_DL_MAP_IE' must be separately indicated. Therefore, first information indicating the OFDMA symbol offset and the number of OFDMA symbols, second information indicating the sub-channel offset and the number of sub-channels, and a rectangular sub-burst indication parameter must be indicated.

If the 'Region Identifier' parameter is used, the region identifier parameter indicates a downlink resource region defined in a downlink channel in a downlink channel descriptor (DCD) message.

The 'Mode' field of Table 1 indicates a HARQ mode. Therefore, if the Mode field is '0b0000', this means a CTC-IR HARQ mode. If the Mode field is '0b001', this means a CTC-IR HARQ mode. If the Mode field is '0b0010', this means a CC-IR HARQ mode. If the Mode field is '0b0011', this means an MIMO Chase HARQ mode. If the Mode field is '0b0100', this means an MIMO IR HARQ mode. If the Mode field is '0b0101', this means an MIMO CC-IR HARQ mode. If the Mode field is '0b0110', this means an MIMO STC HARQ mode. In this case, '0b0111-0b1111' indicate reserved fields for other HARQ modes.

The 'Subburst IE Length' parameter of Table 1 indicates a sub-burst length in a corresponding HARQ mode. If the mobile station does not support the HARQ mode used by the base station, the mobile station may ignore the DL HARQ sub-burst transferred to the corresponding HARQ mode. However, each mobile station must decode the NACK channel field of the DL_HARQ sub-burst IE in order to determine an uplink ACK channel.

The following Table 2 shows an exemplary downlink Chase HARQ sub-burst format.

TABLE 2

| Syntax | Bit | Notes |
|---|---|---|
| DL_HARQ_Chase_Sub-Burst_IE( ) { | | |
| N sub-burst[ISI] | 4 | Number of sub-bursts in the 2D rectangular region is this field value plus 1. |
| N ACK channel | 4 | Number of HARQ ACK enabled subbursts in the 2D region. |
| For (j=0; j<Number of sub-bursts; j++){ | | |
| RCID_IE( ) | variable | |
| Duration | 10 | Duration in slots |
| Sub-Burst DIUC Indicator | 1 | If Sub-Burst DIUC Indicator is 1, it indicates that DIUC is explicitly assigned for this subburst. Otherwise, this subburst will use the same DIUC as the previous subburst. If j is 0 then this indicator shall be 1. |
| Reserved | 1 | Shall be set to zero. |
| If(Sub-Burst DIUC Indicator==1){ | | |
| DIUC | 4 | |
| Repetition Coding Indication | 2 | 0b00: No repetition coding 0b01: Repetition coding of 2 used 0b10: Repetition coding of 4 used 0b11: Repetition coding of 6 used |
| Reserved | 2 | Shall be set to zero. |
| } | | |
| ACID | 4 | |
| AI_SN | 1 | |
| ACK disable | 1 | When ACK Disable = = 1, the allocated subburst does not require an ACK to be transmitted by the SS in the ACKCH Region (see 8.4.5.4.25). In this case, no ACK channel is allocated for the subburst in the ACKCH Region. For the burst, BS shall not perform HARQ retransmission and MS shall ignore ACID, AI_SN and SPID, which shall be set to 0 by BS if they exist. |
| Dedicated DL Control Indicator | 2 | LSB #0 indicates inclusion of CQI control LSB #1 indicates inclusion of Dedicated DL Control IE. |
| If(LSB #0 of Dedicated DL Control Indicator= = 1){ | | |
| Duration (d) | 4 | A CQI feedback is transmitted on the CQI channels indexed by the (CQI Channel Index) by the SS for $2^{(d-1)}$ frames. If d is 0b0000, it deallocates all CQI feedback when the current ACID is completed successfully. If d is 0b1111, the MS should report until the BS command for the MS to stop. |
| If (Duration!=0b0000){ | | |
| Allocation Index | 6 | Index to the channel in a frame the CQI report should be transmitted by the SS. |
| Period (p) | 3 | A CQI feedback is transmitted on the CQI channels indexed by the (CQI |

TABLE 2-continued

| Syntax | Bit | Notes |
|---|---|---|
| | | Channel Index) by the SS in every 2p frames. |
| Frame offset | 3 | The MS starts reporting at the frame of which the number has the same 3 LSB as the specified frame offset. If the current frame is specified, the MS should start reporting in eight frames. |
| } | | |
| } | | |
| If(LSB#1 of Dedicated DL Control Indicator= = 1) { | | |
|    Dedicated DL Control IE ( ) | variable | |
|   } | | |
| } | | |
| } | | |

The 'DL_HARQ_Chase_SubBurst_IE' field may be contained in the HARQ MAP message of Table 1. Namely, if the 'Mode' field of Table 1 is '0b0000', the HARQ mode used by the base station is the Chase HARQ mode.

With reference to Table 2, the 'N sub-burst[ISI]' field indicates the number of sub-bursts in a two-dimensional rectangular region. The 'N ACK channel' field indicates the number of sub-bursts capable of being allocated for HARQ ACK transmission in a two-dimensional region.

The size of radio resources allocated to Table 2 increases in proportion to the number of sub-bursts.

The reduced CID (RCID_IE) indicates the type of the RCID used by the base station. The 'Duration' parameter is a slot valid interval per sub-burst. If the 'sub-burst DIUC indicator' field is set to '1', this means that the DIUC is definitely allocated to the corresponding sub-burst. If the 'sub-burst DIUC indicator' field is set to '0', this means that the corresponding sub-burst uses the same DIUC as that of a previous sub-burst.

If the 'sub-burst indicator' field is set to '1', the DIUC is allocated on the basis of a sub-burst, and the 'Repetition Coding Indication' field indicates the repetition coding used for the allocated burst. If the 'Repetition Coding Indication' field is set to '0b00', this means no repetition coding. If the 'Repetition Coding Indication' field is set to '0b01', this means that the repetition coding is used twice, If the 'Repetition Coding Indication' field is set to "0b10", this means that the repetition coding is used four times. If the 'Repetition Coding Indication' field is set to '0b11', this means that the repetition coding is used six times.

The 'ACID' field is used to manage the HARQ channel, and is assigned in unit of sub-burst. The 'AI_SN' field is used to discriminate between the initial transmission and the retransmission, such that it can identify the ARQ sequence number. If the 'ACK disable' field is set to '1', the allocated sub-burst does not request the ACK signal transferred by the mobile station within the allocated ACK region. In this case, no ACK channel is allocated to the sub-burst in the ACK region. The base station does not carry out the HARQ retransmission for the above burst, and the mobile station ignores 'ACID', 'AI_SN' and 'SIPD' parameters related to this burst.

'LSB #0' bit of the 'Dedicated DL Control Indicator' parameter indicates whether or not the CQI control is included, and 'LSB #1' bit indicates whether or not the dedicated downlink control indicator is included.

If the 'LSB #0' bit of the 'Dedicated DL Control Indicator' parameter is '1', a CQI feedback is transmitted over a channel indexed to a CQI channel index every 2(d−1) frames.

If the 'Duration' field is not set to '0b0000', the 'Allocation Index' parameter indicates a channel index to which the CQI report will be forwarded by the mobile station in the frame.

Also, the CQI feedback is transmitted to the CQI channels indexed by the CQI channel index every 2P frames. In this case, the 'Period' parameter represents a transmission period (p) of the CQI feedback.

The mobile station (MS) starts reporting at the frames corresponding to three LSBs in a specified frame offset. In this case, the 'Frame Offset' parameter indicates the MS reporting start point. If the current frame is a specified frame, the mobile station starts transmission at eight frames.

The following Table 3 shows an exemplary CTC-IR HARQ sub-burst format.

TABLE 3

| Syntax | Bit | Notes |
|---|---|---|
| DL_HARQ_IR_CTC_Sub-Burst_IE( ) { | — | — |
|   N sub-burst[ISI] | 4 | Number of sub-bursts in the 2D rectangular region is this field value plus 1. |
|   N ACK channel | 4 | Number of HARQ ACK enabled subbursts in the 2D region. |
|   For (j=0; j<Number of sub-bursts; j++){ | — | — |
|     RCID_IE( ) | variable | — |
|     $N_{EP}$ | 4 | — |
|     $N_{SCH}$ | 4 | — |
|     SPID | 2 | — |
|     ACID | 4 | — |

TABLE 3-continued

| Syntax | Bit | Notes |
|---|---|---|
| AI_SN | 1 | — |
| ACK disable | 1 | When ACK Disable == 1, the allocated subburst does not require an ACK to be transmitted by the SS in the ACKCH Region (see 8.4.5.4.25). In this case, no ACK channel is allocated for the subburst in the ACKCH Region. For the burst, BS shall not perform HARQ retransmission and MS shall ignore ACID, AI_SN and SPID, which shall be set to 0 by BS if they exist. |
| Reserved | 2 | Shall be set to zero. |
| Dedicated DL Control Indicator | 2 | LSB #0 indicates inclusion of CQI control LSB #1 indicates inclusion of Dedicated DL Control IE. |
| If(LSB#0 of Dedicated DL Control Indicator == 1){ | — | — |
| Duration (d) | 4 | A CQI feedback is transmitted on the CQI channels indexed by the (CQI Channel Index) by the SS for $2^{(d-1)}$ frames. If d is 0b0000, it deallocates all CQI feedback when the current ACID is completed successfully. If d is 0b1111, the MS should report until the BS command for the MS to stop. |
| If(Duration!=0b0000){ | — | — |
| Allocation Index | 6 | Index to the channel in a frame the CQI report should be transmitted by the SS. |
| Period (p) | 3 | A CQI feedback is transmitted on the CQI channels indexed by the (CQI Channel Index) by the SS in every 2p frames. |
| Frame offset | 3 | The MS starts reporting at the frame of which the number has the same 3 LSB as the specified frame offset. If the current frame is specified, the MS should start reporting in eight frames. |
| } | — | — |
| } | — | — |
| If(LSB#1 of Dedicated DL Control Indicator == 1) { | — | — |
| Dedicated DL Control IE ( ) | variable | — |
| } | — | — |
| } | — | — |
| } | | |

The 'DL_HARQ_IR_CTC_Sub-Burst_IE' field of Table 3 may be contained in the HARQ MAP message of Table. Namely, if the 'Mode' field of Table 1 is '0b0001', the HARQ mode used by the base station is the IR-CTC HARQ mode.

With reference to Table 3, the 'N sub-burst[ISI]' field indicates the number of sub-bursts in a two-dimensional rectangular region, The 'N ACK channel' field indicates the number of sub-bursts capable of being allocated for HARQ ACK transmission in a two-dimensional region.

The size of radio resources allocated to Table 3 increases in proportion to the number of sub-bursts. The reduced CID (RCID_IE) parameter indicates the type of the RCID allocated to each mobile station. NEP and NSCH parameters indicate the IR-CTC HARQ burst profile. Also, the SPID parameter indicates a service flow identifier, the ACID parameter is allocated on the basis of a sub-burst. Namely, the ACID parameter for each sub-burst is used to manage several HARQ channels. The AI_SN parameter is used to discriminate between the initial transmission and the retransmission.

If the 'ACK disable' field is set to '1', the allocated subburst does not request the ACK signal transferred by the mobile station within the allocated ACK region. In this case, no ACK channel is allocated to the sub-burst in the ACK region. The base station does not carry out the HARQ retransmission for the above burst, and the mobile station ignores 'ACID', 'AI_SN' and 'SIPD' parameters related to this burst. In this case, a CRC parameter may be added to the end of each sub-burst, irrespective of the ACK disable bit. 'LSB #0' bit of the 'Dedicated DL Control Indicator' parameter indicates whether or not the CQI control is included, and 'LSB #1' bit indicates whether or not the dedicated downlink control indicator is included.

If the 'LSB #0' bit of the 'Dedicated DL Control Indicator' parameter is '1', a CQI feedback is transmitted over a channel indexed to a CQI channel index every 2(d−1) frames.

If the 'Duration' field is not set to '0b0000' the 'Allocation Index' parameter indicates a channel index to which the CQI report will be forwarded by the mobile station in the frame. The CQI feedback is transmitted to the CQI channels indexed by the CQI channel index every 2P frames. In this case, the 'Period' parameter represents a transmission period (p) of the CQI feedback.

The mobile station (MS) starts reporting at the frames corresponding to three LSBs in a specified frame offset. In this case, the 'Frame Offset' parameter indicates the MS reporting start point. If the current frame is a specified frame, the mobile station starts transmission at eight frames.

Generally, in order to support the HARQ scheme, the base station transmits HARQ-associated information to a mobile station via an MAP message. In this case, transmitting all of the HARQ-associated information when there are a large amount of HARQ traffic may unavoidably encounter a large amount of overhead. Therefore, embodiments of the present invention provide a method for transferring only differential information on the basis of MAP information which has been initially received from the base station. As a result, an amount of MAP overhead associated with the HARQ can be reduced, resulting in the improvement of a system performance.

Figure 3:
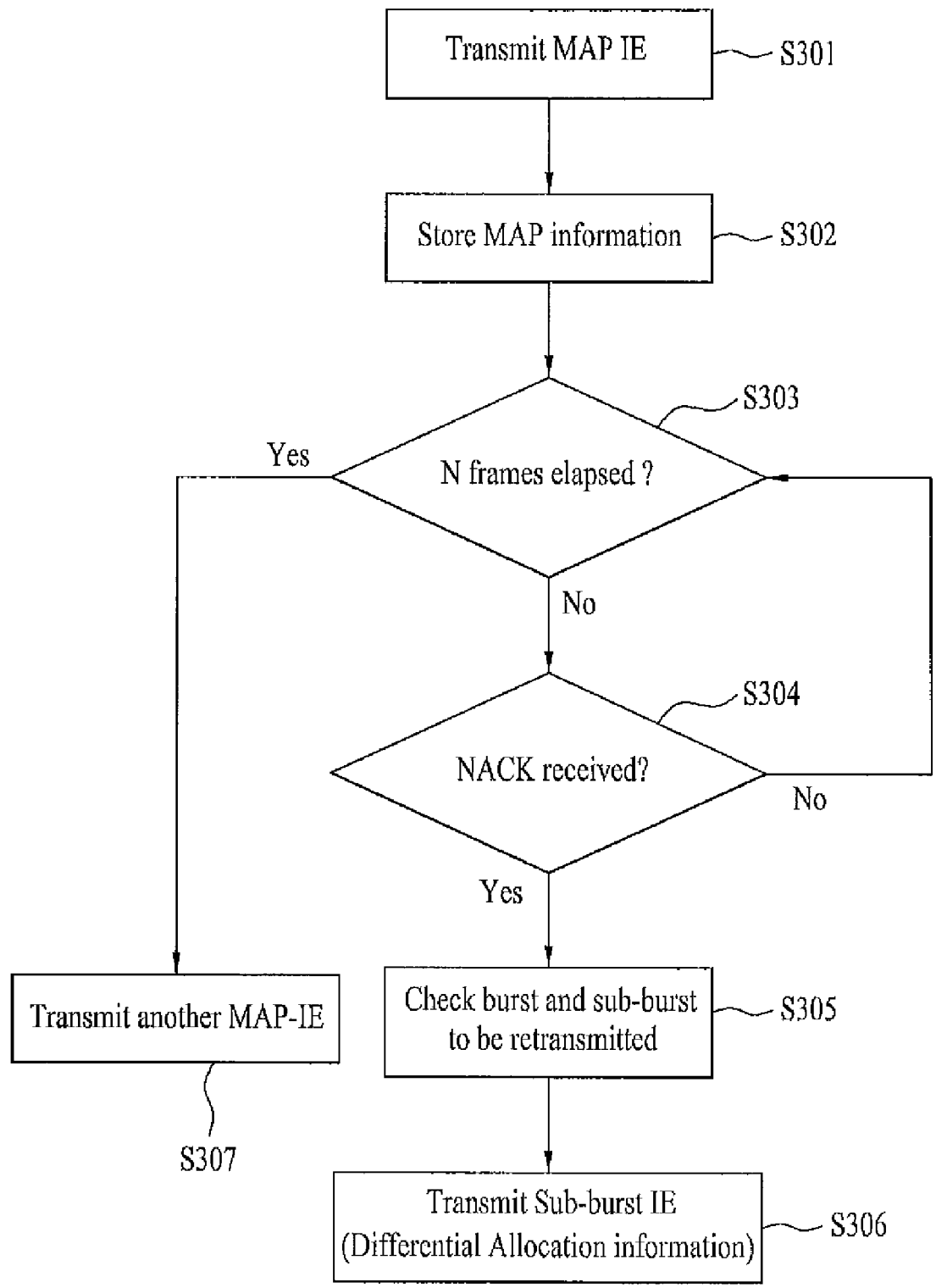
FIG. 3 is a flow chart illustrating a method for transmitting only a difference of information to be retransmitted on the basis of specific information capable of being recognized by an MAP message received from a previous frame according to one embodiment of the present invention.

FIG. 3 is a flow chart illustrating a method for transmitting only a difference of information to be retransmitted on the basis of specific information capable of being recognized by a MAP message received from a previous frame according to the present invention.

This embodiment of FIG. 3 relates to a resource allocation method for packets retransmitted to the mobile station. For the convenience of description, this method proposed by the present invention will hereinafter be referred to as a differential allocation method.

Referring to FIG. 3, the base station transmits the MAP message having the MAP IE field to at least one mobile station contained in its own cell area at step S301.

At step S301, the MAP message may be an SBC (SS Basic Capability) message, a DSx (Dynamic Service Addition/Change/deletion) message, or an REG (Registration) message. Also, specific information indicating whether or not a differential allocation method will be used is contained in the MAP message, such that the resultant MAP message may be transferred to mobile stations.

The base station stores RQ (Repeat reQuest)-associated information (e.g., MAP information) contained in the MAP IE field transferred by the base station itself during a predetermined frame at step S302. At step S302, the MAP information may include location information (or index information) of sub-bursts to be retransmitted at step S302.

At step S302, it is assumed that specified frames are n frames. The number of specified frames may be changed to another according to either a communication environment between the mobile station and the base station or a user request. At step S302, the mobile station having received the MAP IE message from the base station may store retransmission-associated information contained in the MAP IE during the n frames.

The mobile station and the base station may store the MAP information during the n frames. In this case, the base station monitors whether or not the NACK signal has been received from the mobile station during the n frames at step S303.

If the base station receives the NACK signal from the mobile station within the n frames at step S304, the base station is able to check a burst and a sub-frame, which will be retransmitted in response to the NACK signal at step S305.

The base station stores index information of the sub-bursts for retransmission contained in the MAP information during the n frames, such that the base station selects only specific information needed for retransmission, instead of all MAP IEs, and transmits the selected information to the mobile station at step S306.

In other words, at step S306, the base station selects only the sub-burst IE needed for retransmission, and transmits the selected sub-burst IE to the mobile station. In this case, a differential allocation method may be used.

If the NACK signal is not received during the n frames, the base station may transmit another MAP IE for the HARQ to the mobile station at step S307.

Figure 4:
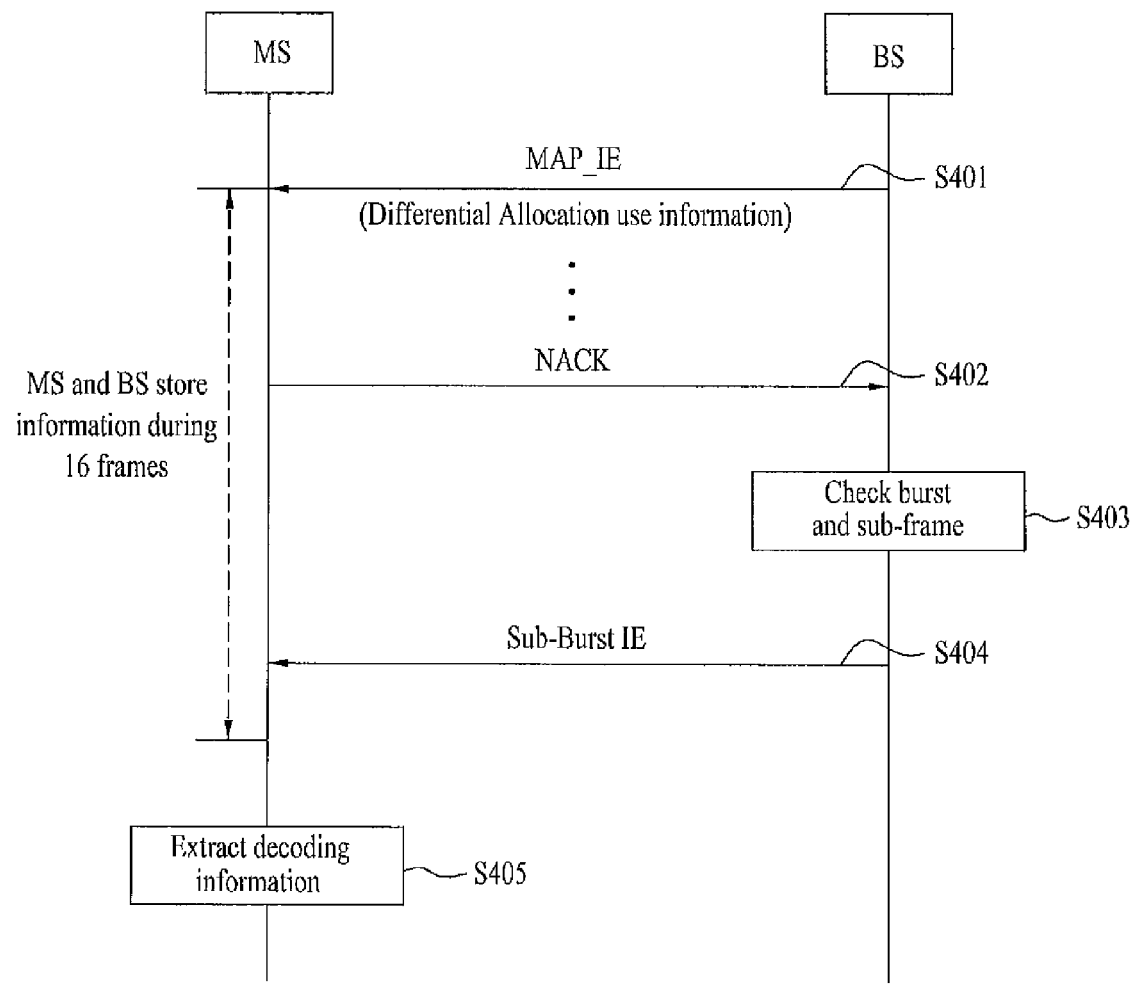
FIG. 4 is a flow chart illustrating a method for performing a HARQ using a differential allocation method between a base station and a mobile station according to one embodiment of the present invention.

FIG. 4 is a flow chart illustrating a method for performing a HARQ using a differential allocation method between a base station and a mobile station according to one embodiment of the present invention.

Referring to FIG. 4, if the base station communicates with the mobile station using the HARQ, the base station may transmit HARQ-associated parameters to the MAP messages using the MAP messages. In this case, the MAP message may be an SBC message, a DSx message, and a REG message such as an MAC management message. Also, the base station includes differential allocation use information in the MAP message, and transmits the resultant MAP message to the mobile station at step S401.

It is assumed that the embodiment of the present invention uses the differential allocation method. Therefore, the base station and the mobile station store MAP information of a current frame, and store the MAP information during specified frames. In this embodiment of the present invention, the specified frames may be 16 frames. Needless to say, the number of frames may be determined by system environments or user requests.

In this case, the base station and the mobile station store MAP information of the current frame, and then maintain the MAP information during 16 frames. Therefore, the base station and the mobile station may have MAP information about a maximum of 16 frames at a specified frame.

If an unexpected error occurs in data packets transferred from the base station while the data packets are communicated between the mobile station and the base station, the mobile station may transmit the NACK signal to the base station at step S402.

Since the NACK signal has been received within the 16 frames after the MAP message has been transferred, the base station can recognize which one of previous frames has received the retransmitted sub-frame upon receiving the stored MAP information. In this case, the base station may select a predetermined number of frames to which the largest number of sub-bursts is retransmitted. Also, the base station can recognize not only the order of bursts having sub-bursts to be retransmitted to the selected frame, but also the order of sub-bursts at the corresponding burst at step S403.

The base station selects sub-burst allocation information about packets indicated by the NACK signal from the stored MAP information, and can transmit the selected information to the mobile station. In this case, the base station may inform the mobile station of the location (i.e., index) of packets to be retransmitted using the differential allocation method. Namely, the base station may transmit the sub-burst IE having differential allocation information to the mobile station at step S404.

At step S404, in order to transmit packets to be retransmitted to the mobile station, the base station may transmit the sub-burst IE to the mobile station, wherein the sub-burst IE includes information of pre-transmitted allocation location information and a repetition coding indication parameter of the sub-burst to be retransmitted.

At step S404, the differential allocation information contained in the sub-burst IE may include the 'N frame reference' parameter and a "Reference Frame Offset" parameter. This 'N frame reference' parameter indicates which one of frames has received the sub-burst to be retransmitted. Also, the dif-ferential allocation information may further include 'Reference Burst number' information based on the 'Reference Frame Offset,' parameter, 'N reference sub-burst' information indicating which one of sub-bursts is used, and 'Reference Sub-burst Index' information indicating an index of the sub-burst.

The differential allocation method may be applied to a variety of HARQ modes. This embodiment of the present invention will show an exemplary case in which the differential allocation method is applied to the Chase Combining HARQ mode and the IR-CTC HARQ mode. Needless to say, other HARQ methods can also be applied to the Chase Combining HARQ mode and the IR-CTC HARQ mode according to communication environments or user requests. Examples of the sub-burst IE formats capable of being used at the above step S404 will hereinafter be described with reference to Tables 4 and 5.

The following Table 4 shows an example of the sub-burst IE format having differential allocation information under the Chase Combining HARQ mode to which the differential allocation method is applied.

TABLE 4

| Syntax | Bit | Notes |
|---|---|---|
| Diff_DL_HARQ_Chase_Sub-Burst_IE( ) { | | |
| N sub-burst[ISI] | 4 | Number of sub-bursts in the 2D rectangular region is this field value plus 1. |
| N ACK channel | 4 | Number of HARQ ACK enabled subbursts in the 2D region. |
| For(j=0; j<Number of sub-bursts; j++){ | | |
| RCID_IE( ) | variable | |
| Duration | 10 | Duration in slots |
| Sub-Burst DIUC Indicator | 1 | If Sub-Burst DIUC Indicator is 1, it indicates that DIUC is explicitly assigned for this subburst. Otherwise, this sub-burst will use the same DIUC as the previous subburst. If j is 0 then this indicator shall be 1. |
| Reserved | 1 | Shall be set to zero. |
| If( Sub-Burst DIUC Indicator == 1){ | | |
| DIUC | 4 | |
| Repetition Coding Indication | 2 | 0b00: No repetition coding 0b01: Repetition coding of 2 used 0b10: Repetition coding of 4 used 0b11: Repetition coding of 6 used |
| Reserved | 2 | Shall be set to zero. |
| } | | |
| ACID | 4 | |
| AI_SN | 1 | |
| ACK disable | 1 | When ACK Disable = =1, the allocated sub-burst does not require an ACK to be transmitted by the SS in the ACK CH Region (see 8.4.5.4.25). In this case, no ACK channel is allocated for the subburst in the ACK CH Region. For the burst, BS shall not perform HARQ retransmission and MS shall ignore ACID, AI_SN and SPID, which shall be set to 0 by BS if they exist. |
| Dedicated DL Control Indicator | 2 | LSB #0 indicates inclusion of CQI control. LSB #1 indicates inclusion of Dedicated DL Control IE. |

TABLE 4-continued

| Syntax | Bit | Notes |
|---|---|---|
| If(LSB #0 of Dedicated DL Control Indicator= =1){ | | |
| Duration (d) | 4 | A CQI feedback is transmitted on the CQI channels indexed by the (CQI Channel Index) by the SS for $2^{(d-1)}$ frames. If d is 0b0000, it deallocates all CQI feedback when the current ACID is completed successfully. If d is 0b1111, the MS should report until the BS command for the MS to stop. |
| If(Duration != 0b0000){ | | |
| Allocation Index | 6 | Index to the channel in a frame the CQI report should be transmitted by the SS. |
| Period (p) | 3 | A CQI feedback is transmitted on the CQI channels indexed by the (CQI Channel Index) by the SS in every 2p frames. |
| Frame offset | 3 | The MS starts reporting at the frame of which the number has the same 3 LSB as the specified frame offset. If the current frame is specified, the MS should start reporting in eight frames. |
| } | | |
| } | | |
| If(LSB#1 of Dedicated DL Control Indicator= =1){ | | |
| Dedicated DL Control IE ( ) | variable | |
| } | | |
| Differential allocation Indicator | 1 | If Differential allocation Indicator is 1, it indicates inclusion of differential allocation. |
| reserved | 3 | Shall be set to zero. |
| if(Differential allocation Indicator= =1) { | | |
| N frame reference | 4 | Number of frames to be referenced by this IE. |
| for(i=0;i<N frame reference; i++){ | | |
| Reference Frame offset | 4 | Offset in frames with respect to this frame. This offset should be larger than 1. |
| Reference Burst number | 4 | Burst number in frames defined by frame offset. |
| N reference sub-burst | 4 | Indicate sub-burst number to be referenced |
| for(k=0;k<N reference sub-burst; k++){ | | |
| Reference Sub-Burst index | 4 | Indicate sub-burst position in the Burst Defined by Reference Burst number and Reference Frame offset |
| Repetition Coding Indication | 4 | |
| reserved | 2 | Shall be set to zero. |
| } | | |
| } | | |
| } | | |
| } | | |

Table 4 is basically similar to Table 2. Table 4 shows a 'Diff_DL_HARQ_Chase_Sub-Burst_IE' format to which the differential allocation method is applied. Therefore, for the convenience of description, in order to apply the differential allocation method to the above-mentioned 'Diff_DL_HARQ_Chase_Sub-Burst_IE' sub-burst, only additional information will hereinafter be described in detail. Explanations of other parameters may refer to the explanation of Table 2.

Referring to FIG. 4, if the 'Differential allocation Indicator' parameter is set to '1', this means that the differential allocation method is applied to the above-mentioned 'Diff_DL_HARQ_Chase_Sub-Burst_IE' sub-burst. In this case, the 'N frame reference' parameter may indicate which one of frames includes the sub-burst of packets to be retransmitted. According to the number of frame reference parameters, the 'Reference Frame Offset' parameter indicates offset information of the corresponding frame. In this case, the 'Reference Burst Number' parameter indicates the number of bursts of the frame defined by the frame offset. Also, the 'N reference sub-burst' parameter may indicate the number of reference sub-bursts.

According to the number of sub-bursts, the 'Reference sub-burst index' parameter may indicate an index of the sub-burst, i.e., location information of the sub-burst. In this case, the sub-burst index may be defined by the 'Reference Burst Number' parameter and the 'Reference Frame Offset' parameter. Also, individual sub-bursts may have different coding rates. Therefore, the 'Repetition Coding indication' parameter may be notified to each sub-burst.

The following Table 5 shows an example of the sub-burst IE format having differential allocation information under the IR-CTC HARQ mode to which the differential allocation method is applied.

TABLE 5

| Syntax | bit | Notes |
|---|---|---|
| Diff_DL_HARQ_IR_CTC_Sub-Burst_IE( ) { | — | — |
|   N sub-burst[ISI] | 4 | Number of sub-bursts in the 2D rectangular region is this field value plus 1. |
|   N ACK channel | 4 | Number of HARQ ACK enabled subbursts in the 2D region. |
|   For(j=0; j<Number of sub-bursts; j++){ | — | — |
|     RCID_IE( ) | variable | — |
|     $N_{EP}$ | 4 | — |
|     $N_{SCH}$ | 4 | — |
|     SPID | 2 | — |
|     ACID | 4 | — |
|     AI_SN | 1 | — |
|     ACK disable | 1 | When ACK Disable ==1, the allocated subburst does not require an ACK to be transmitted by the SS in the ACKCH Region (see 8.4.5.4.25). In this case, no ACK channel is allocated for the subburst in the ACKCH Region. For the burst, BS shall not perform HARQ retransmission and MS shall ignore ACID, AI_SN and SPID, which shall be set to 0 by BS if they exist. |
|     Reserved | 2 | Shall be set to zero. |
|     Dedicated DL Control Indicator | 2 | LSB #0 indicates inclusion of CQI control. LSB #1 indicates inclusion of Dedicated DL Control IE. |
|     If(LSB #0 of Dedicated DL Control Indicator==1){ | — | — |
|       Duration (d) | 4 | A CQI feedback is transmitted on the CQI channels indexed by the (CQI Channel Index) by the SS for $2^{(d-1)}$ frames. If d is 0b0000, it deallocates all CQI feedback when the current ACID is completed successfully. If d is 0b1111, the MS should report until the BS command for the MS to stop. |
|       If(Duration != 0b0000){ | — | — |
|         Allocation Index | 6 | Index to the channel in a frame the CQI report should be transmitted by the SS. |
|         Period (p) | 3 | A CQI feedback is transmitted on the CQI channels indexed by the (CQI Channel Index) by the SS in every 2p frames. |
|         Frame offset | 3 | The MS starts reporting at the frame of which the number has the same 3 LSB as the specified frame offset, If the current frame is specified, the MS should start reporting in eight frames. |
|       } | — | — |
|     } | — | — |
|     If(LSB #1 of Dedicated DL Control Indicator ==1) { | — | — |
|       Dedicated DL Control IE ( ) | variable | — |
|     } | — | — |
|   } | — | — |
|   Differential allocation Indicator | 1 | If Differential allocation Indicator is 1, it indicates inclusion of differential allocation. |

TABLE 5-continued

| Syntax | bit | Notes |
|---|---|---|
| reserved | 3 | Shall be set to zero. |
| if(Differential allocation Indicator==1){ | — | — |
|   N frame reference | 4 | Number of frame to be referenced by this IE. |
|   for(i=0;i<N frame reference;i++){ | — | — |
|     Reference Frame offset | 4 | Offset in frames with respect to this frame. This offset should be larger than 1. |
|     Reference Burst number | 4 | Burst number in frame defined by frame offset |
|     N reference sub-burst | 4 | Indicate sub-burst number to be referenced |
|     for(k=0;k<N reference sub-burst;k++){ | — | — |
|       Reference Sub-Burst index | 4 | Indicate sub-burst position in the Burst defined by Reference Burst number and Reference Frame offset. |
|       $N_{EP}$ | 4 | — |
|       $N_{SCH}$ | 4 | — |
|       SPID | 2 | — |
|       reserved | 2 | Shall be set to zero. |
|     } | — | — |
|   } | — | — |
| } | — | — |
| } | — | — |

Table 5 is basically similar to Table 3. Table 5 shows a 'Diff_DL_HARQ_IR_CTC_Sub-Burst_IE' format to which the differential allocation method is applied. Therefore, in order to apply the differential allocation method to the above mentioned 'Diff_DL_HARQ_Chase_Sub-Burst_IE' sub-burst, only additional information will hereinafter be described in detail. Explanations of other parameters may refer to the explanation of Table 3.

Figure 5:
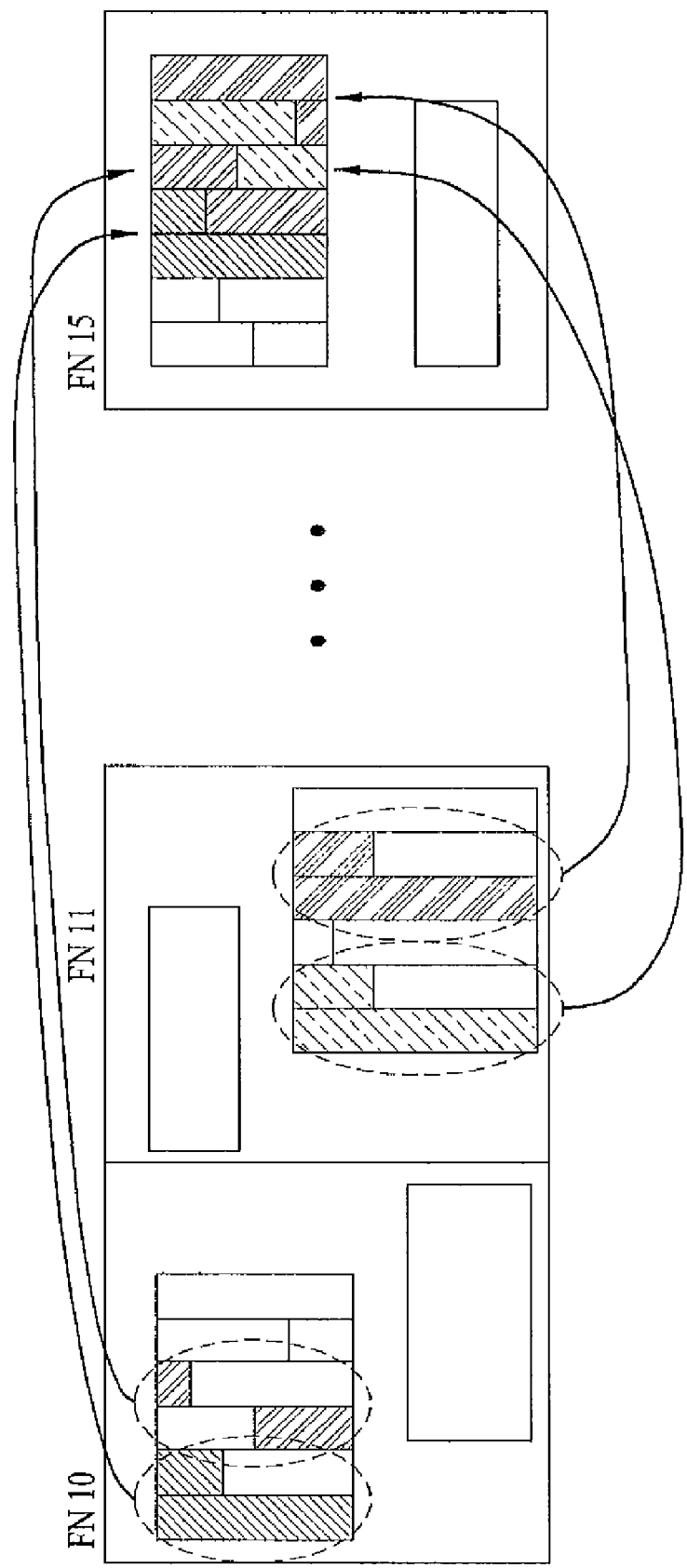
FIG. 5 is a conceptual diagram illustrating a resource allocation method for use in packets retransmitted to a mobile station using a differential allocation method according to one embodiment of the present invention.

Referring to FIG. 5, if the 'Differential allocation Indicator' parameter is set to '1', this means that the differential allocation method is applied to the HARQ mode. Therefore, the parameter indicating the differential allocation information will hereinafter be described. The 'N frame reference' parameter may indicate which one of frames includes the sub-burst of packets to be retransmitted. According to the number of frame reference parameters, the 'Reference Frame Offset' parameter indicates offset information of the corresponding frame. In this case, the 'Reference Burst Number' parameter indicates the number of bursts of the frame defined by the frame offset. Also, the 'N reference sub-burst' parameter may indicate the number of reference sub-bursts.

According to the number of sub-bursts, the 'Reference sub-burst index' parameter may indicate an index of the sub-burst, i.e., location information of the sub-burst. In this case, the sub-burst index may be defined by the 'Reference Burst Number' parameter and the 'Reference Frame Offset' parameter.

Under the IR-CTC HARQ mode, the burst profile (e.g., Modulation Order, Coding Type, or Coding Rate) and the redundancy version of each mobile station may be changed every transmission. Therefore, the burst profile may be notified to each mobile station using NEP and NSCH parameters. Also, in order to identify each service, the base station may further include the service flow identifier (SPID) parameter in the sub-burst IE, such that the resultant sub-burst IE may be transferred to individual mobile stations.

Referring back to FIG. 4, if the sub-burst IE shown in Tables 4 and 5 is transferred to the mobile station at step S404, the mobile station may extract decoding information using differential allocation information at step S405.

At step S405, the mobile station may extract decoding information of the retransmitted packet using the stored MAP information and the differential allocation information contained in the sub-burst IE received from the base station. Namely, the mobile station may chase the packet in the order of frame□burst□sub-burst in the stored MAP information, and may extract the decoding information of the retransmitted packet. The mobile station is able to decode the packet using both the information extracted from the MAP information of a previous frame and the burst profile transmitted at the MAP of a current frame.

Tables 4 and 5 show exemplary cases in which the differential allocation method is applied to the Chase Combining HARQ mode and the IR-CTC HARQ mode. However, it should be noted that the differential allocation method may also be applied to other HARQ modes. For example, in order to select and add a new sub-burst IE, the mode of the HARQ_DL_MAP_IE format is selected to any one of '0b0111'~'0b1111'. The same method as those of Tables 4 and 5 may be applied to not only other HARQ modes of the downlink but also a HARQ mode of the uplink, such that the sub-burst IE may be configured.

Referring to FIG. 4, the mobile station stores the MAP information received at step S401, during specified frames (e.g., 16 frames). The mobile station receives the sub-burst IE to which the received differential allocation method is applied at step S404, such that it can recognize location information (i.e., index information), having decoding information of a current packet to be retransmitted, in the stored MAP information. Therefore, the mobile station may extract the decoding information of the retransmitted packet using the MAP information and the differential allocation information.

FIG. 5 is a conceptual diagram illustrating a resource allocation method for use in packets retransmitted to a mobile station using a differential allocation method according to one embodiment of the present invention.

Referring to FIG. 5, the packet to be retransmitted occurs in 10-th and 11-th frames (FN10 and FN11). Therefore, the base station may inform the mobile station of the index having the decoding information of the packet to be retransmitted using the differential allocation method of FIG. 4. So, the base station is able to allocate the HARQ sub-burst for the retransmission packet at a 15-th frame.

Figure 6:
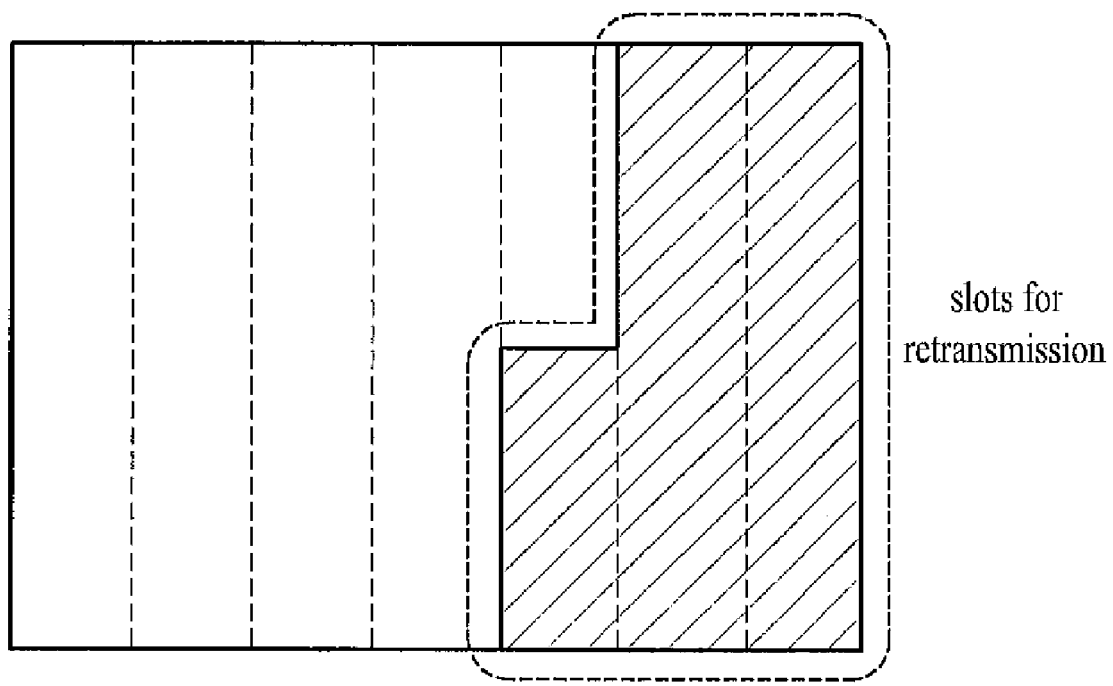
FIG. 6 is a conceptual diagram illustrating a resource allocation method using a sub-burst information element (IE) defined by the embodiment of the present invention.

FIG. 6 is a conceptual diagram illustrating a resource allocation method using a sub-burst IE defined by the embodiment of the present invention.

FIG. 6 shows some parts of the burst. As shown in FIG. 6, the sub-burst for either initial transmission or retransmission may be sequentially allocated to the front areas of the burst, as defined by the conventional sub-burst IE. Only the retransmitted sub-burst can be allocated to the rear areas of the burst, as defined by the sub-burst IE to which the differential allocation method is applied. In this case, the burst area for the retransmitted sub-burst is denoted by dotted lines. Also, in the case of applying the differential allocation method, the ACK-channel allocation may be carried out in the order of bursts in a current MAP area.

Figure 7:
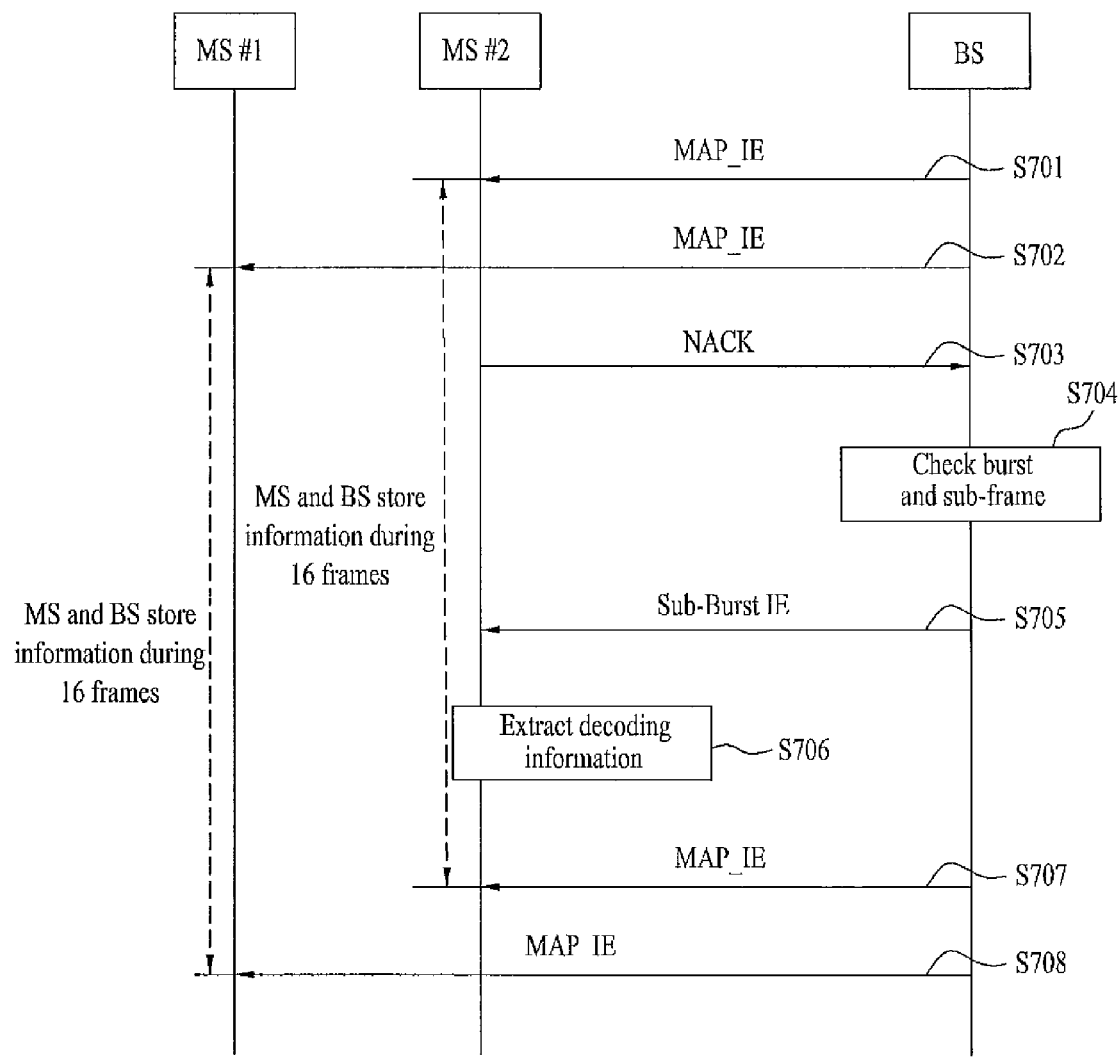
FIG. 7 is a flow chart illustrating a method for performing a HARQ using a differential allocation method between a base station and a mobile station according to another embodiment of the present invention.

FIG. 7 is a flow chart illustrating a method for performing a HARQ using a differential allocation method between the base station and the mobile station according to another embodiment of the present invention.

FIG. 7 shows an exemplary case in which a cell area of the base station includes at least one mobile station. Namely, the system may be comprised of a base station (BS), a first mobile station (MS #1) and a second mobile station (MS #2).

Referring to FIG. 7, if the base station (BS) communicates with the mobile stations (MS #1 and MS #2) using the HARQ, the base station may transmit HARQ-associated parameters to the mobile stations (MS #1 and MS #2) using the MAP messages. In this case, each MAP message may be an SBC message used when a basic capability between the mobile station and the base station is negotiated, a DSx message, or an REG message used as an MAC management message. Also, the base station may further include specific information indicating whether the differential allocation method is used in the MAP message, such that it may transmit the resultant MAP message having the specific information to the mobile stations at steps S701 and S702.

It is assumed that the embodiment of the present invention uses a differential allocation method. Therefore, the base station and the mobile station store MAP information of a current frame, and store the MAP information during predetermined frames. In this embodiment of the present invention, the predetermined frames may be 16 frames. Needless to say, the number of frames may be determined by system environments or user requests.

According to the differential allocation method of FIG. 7, the base station and the mobile stations can store MAP information of the current frame, and can also maintain the stored MAP information during a maximum of 16 frames. Therefore, the base station and the mobile stations can have MAP information of the maximum of 16 frames at a specified frame.

An unexpected error may occur in data packets transferred from the base station while the data packets are communicated between each mobile station and the base station. According to another embodiment of the present invention, it is assumed that the data packet of the first mobile station (MS #1) has no errors and the other data packet of the second mobile station (MS #2) has errors. Therefore, the second mobile station (MS #2) can transmit the NACK signal to the base station at step S703.

Since the NACK signal has been received within the 16 frames after the MAP message has been transferred, the base station can recognize the retransmitted sub-burst information on the basis of the stored MAP information. In this case, the base station may select a predetermined number of frames to which the largest number of sub-bursts is retransmitted. Also, the base station can recognize not only the order of bursts having sub-bursts to be retransmitted to the selected frame, but also the order of sub-bursts at the corresponding burst at step S704.

The base station selects sub-burst allocation information about packets indicated by the NACK signal from the stored MAP information, and can transmit the selected information to the mobile station. In this case, the base station may inform the second mobile station of the location (i.e., index) of packets to be retransmitted using the differential allocation method. Namely, the base station may transmit the sub-burst IE having differential allocation information to the second mobile station at step S705.

At step S705, the differential allocation information contained in the sub-burst IE may include the 'N frame reference' parameter and a "Reference Frame Offset" parameter. This 'N frame reference' parameter indicates which one of frames has received the sub-burst to be retransmitted. Also, the differential allocation information may further include 'Reference Burst number' information based on the 'Reference Frame Offset' parameter, 'N reference sub-burst' information indicating which one of sub-bursts is used, and 'Reference Sub-burst Index' information indicating an index of the sub-burst.

At step S705, the sub-burst IE to which the differential allocation method is applied may be any of sub-burst IEs defined by Tables 4 and 5. Also, the differential allocation method may be applied to a variety of HARQ modes. Another embodiment of the present invention will show an exemplary case in which the differential allocation method is applied to the Chase Combining HARQ mode and the IR-CTC HARQ mode, Needless to say, it should be noted that the differential allocation method be applied to other HARQ methods according to communication environments or user requests.

Referring to FIG. 7, at step S705, if the sub-burst IE of Tables 4 and 5 is transmitted to the second mobile station, the second mobile station may extract decoding information of the packet to be retransmitted using the differential allocation information contained in the sub-burst IE at step S706.

At step S706, the second mobile station may extract decoding information of the retransmitted packet using the stored MAP information and the differential allocation information contained in the sub-burst IE received from the base station. Namely, the second mobile station may chase the packet in the order of frame□burst□sub-burst in the stored MAP information, and may extract the decoding information of the retransmitted packet. The second mobile station is able to decode the packet using both the information extracted from the MAP information of a previous frame and the burst profile transmitted at the MAP of a current frame.

After the lapse of predetermined frames, the base station may transmit a message having new MAP information to all mobile stations contained in its own cell area at steps S707 and S708. Thereafter, the differential allocation method can also be continuously applied such that the HARQ sub-burst can be allocated to the mobile stations.

Presently, in case of a Persistent allocation for a Voice over Internet Protocol (VoIP) which is being discussed in the WiMAX forum, the base station transmits only one IE during the initial transmission, such that it can periodically allocate resources to mobile stations during several frames. If the frame offset value is set to '0' to support the persistent allocation, the mobile station may recognize this frame offset value of '0' as retransmission of the allocated packet in the persistent allocation. Therefore, if the above-mentioned embodiments of the present invention are applied to the VoIP, the packet index information (i.e., packet location information) at the persistent allocation IE is transferred to each mobile station, such that the base station may use the differential allocation method for retransmission in case of the VoIP.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Therefore, the above-mentioned detailed description must be considered for only illustrative purposes instead of restrictive purposes. The scope of the present invention must be decided by a rational analysis of claims, and all modifications within equivalent ranges of the present invention are contained in the scope of the present invention. It is obvious to those skilled in the art that claims having no explicit citation relationships are combined with each other to implement the embodiments, or new claims obtained by the amendment after the patent application may also be contained in the present invention without departing from the scope and spirit of the present invention.

As apparent from the above description, the embodiments of the present invention can be applied to a variety of wireless access systems, for example, a 3rd Generation Partnership Project (3GPP), a 3GPP2, and/or an IEEE 802.xx (Institute of Electrical and Electronic Engineers 802) system. The embodiments of the present invention can be applied to not only the various wireless access systems but also all the technical fields acquired by the application of these wireless access systems.

What is claimed is:

1. A resource allocation method for a hybrid automatic repeat request (HARQ), the method comprising:
    transmitting, by a base station, a media access protocol (MAP) message including information indicating whether or not a differential allocation is supported,
    wherein MAP information contained in the MAP message is stored by the base station during predetermined frames;
    upon receiving, by the base station, a non-acknowledgement (NACK) message during the predetermined frames, transmitting sub-burst information including differential allocation information related to sub-bursts to be retransmitted,
    wherein the differential allocation information includes information indicating
        a number of reference frames pre-transmitted for the sub-bursts in the predetermined frames,
        a reference frame offset from a frame transmitted for the sub-burst information based on the number of the reference frames,
        a number of reference sub-bursts, and
        a reference sub-burst index based on the reference frame offset and the number of reference sub-bursts, and
    wherein the sub-bursts are decoded using a decoding information included in the MAP information indicated by the differential allocation information.

2. The method according to claim 1, wherein the sub-burst information includes repetition coding indication information related to the sub-bursts.

3. The method according to claim 1, wherein the sub-burst information includes sub-burst profile information.

4. The method according to claim 1, wherein the MAP message is a subscribe station basic capability (SBC) message, a dynamic service addition message, a dynamic service change message, a dynamic service deletion message, or registration (REG) message.

5. A resource allocation method for a hybrid automatic repeat request (HARQ), the method comprising:
    receiving, by a mobile station, a media access protocol (MAP) message including specific information indicating whether or not differential allocation is supported,
    wherein MAP information contained in the MAP message is stored by the mobile station during predetermined frames;
    transmitting, by the mobile station, a non-acknowledgement (NACK) message to a base station, if there occurs any error in data packets received during the predetermined frames; and
    receiving, by the mobile station, sub-burst information, which includes differential allocation information related to sub-bursts for retransmitting the data packets, from the base station,
    wherein the differential allocation information includes information indicating
        a number of reference frames pre-transmitted for the sub-bursts in the predetermined frames,
        a reference frame offset from a frame transmitted for the sub-burst information based on the number of the reference frames,
        a number of reference sub-bursts, and
        a reference sub-burst index based on the reference frame offset and the number of reference sub-bursts, and
    wherein the sub-bursts are decoded using a decoding information included in the MAP information indicated by the differential allocation information.

6. The method according to claim 5, wherein the sub-burst information includes repetition coding indication information related to the sub-bursts.

7. The method according to claim 5, wherein the sub-burst information includes sub-burst profile information.

* * * * *